US 9,342,383 B2

(12) United States Patent
Barros et al.

(10) Patent No.: US 9,342,383 B2
(45) Date of Patent: May 17, 2016

(54) STREAMING OPERATIONS FOR WORKFLOW PROCESS MODELS USING MULTIPLE VIEWS ON A SAME BUFFER

(75) Inventors: Alistair P. Barros, Camira (AU); Torben Schreiter, Bochum (DE)

(73) Assignee: SAP SE, Walldorf (DE)

( * ) Notice: Subject to any disclaimer, the term of this patent is extended or adjusted under 35 U.S.C. 154(b) by 1739 days.

(21) Appl. No.: 12/040,751

(22) Filed: Feb. 29, 2008

(65) Prior Publication Data

US 2009/0172691 A1    Jul. 2, 2009

Related U.S. Application Data

(60) Provisional application No. 61/017,499, filed on Dec. 28, 2007.

(51) Int. Cl.
| G06F 9/54 | (2006.01) |
| G06F 9/52 | (2006.01) |
| G06Q 10/06 | (2012.01) |

(52) U.S. Cl.
CPC ............. *G06F 9/544* (2013.01); *G06F 9/526* (2013.01); *G06Q 10/06* (2013.01)

(58) Field of Classification Search
None
See application file for complete search history.

(56) References Cited

U.S. PATENT DOCUMENTS

| 5,283,899 | A | * | 2/1994 | Cook et al. .................... 718/102 |
| 5,408,653 | A | * | 4/1995 | Josten et al. |
| 5,530,902 | A | * | 6/1996 | McRoberts et al. ............ 710/28 |
| 5,764,543 | A | * | 6/1998 | Kennedy ........................... 703/2 |
| 5,870,545 | A | * | 2/1999 | Davis et al. ................... 709/201 |
| 6,286,076 | B1 | * | 9/2001 | Schultz ......................... 711/101 |
| 6,397,192 | B1 | * | 5/2002 | Notani et al. ................ 705/7.26 |
| 6,772,407 | B1 | * | 8/2004 | Leymann et al. ............. 717/100 |
| 7,305,649 | B2 | * | 12/2007 | Bellas et al. ................. 716/102 |
| 2003/0145186 | A1 | * | 7/2003 | Szendy et al. ................ 711/173 |
| 2004/0177228 | A1 | * | 9/2004 | Leonhardt et al. ........... 711/170 |
| 2007/0067508 | A1 | * | 3/2007 | Chai et al. ....................... 710/33 |
| 2007/0088919 | A1 | * | 4/2007 | Shen et al. .................... 711/154 |
| 2007/0094453 | A1 | * | 4/2007 | Santhanakrishnan et al. .......................... 711/137 |
| 2007/0157204 | A1 | | 7/2007 | Leymann et al. |
| 2007/0230584 | A1 | * | 10/2007 | Chiu et al. ............... 375/240.26 |
| 2008/0209420 | A1 | * | 8/2008 | Matsuo ......................... 718/100 |
| 2008/0244152 | A1 | * | 10/2008 | Chai et al. ......................... 711/3 |

(Continued)

OTHER PUBLICATIONS

Biörnstad, Biörn Johan. A workflow approach to stream processing. ETH (2008). doi:10.3929/ethz-a-005671753; 149 total pages.*

(Continued)

*Primary Examiner* — Keith Vicary
(74) *Attorney, Agent, or Firm* — Brake Hughes Bellermann LLP

(57) ABSTRACT

A buffer may be configured to store a plurality of items, and to be accessed by one or more activities of an instance of a process model. A scheduler may be configured to schedule execution of each of a plurality of activities of the process model, and to determine an activation of an activity of the plurality of activities. The scheduler may include an activity manager configured to access an activity profile of the activity upon the determining of the activation, the activity profile including buffer access characteristics according to which the activity is designed to access the buffer. A process execution unit may be configured to execute the activity and may include a buffer access manager configured to access the buffer according to the buffer access characteristics of the activity profile, and to thereby facilitate an exchange of at least one item between the buffer and the activity.

20 Claims, 6 Drawing Sheets

(56) References Cited

U.S. PATENT DOCUMENTS

| | | | |
|---|---|---|---|
| 2008/0259489 A1* | 10/2008 | Brady et al. | 360/77.08 |
| 2008/0301419 A1* | 12/2008 | Barros et al. | 712/233 |
| 2008/0301684 A1* | 12/2008 | Barros et al. | 718/102 |
| 2009/0150900 A1* | 6/2009 | Kowalkiewicz et al. | 718/106 |
| 2009/0171729 A1* | 7/2009 | Anisimov et al. | 705/8 |
| 2010/0146241 A1* | 6/2010 | Rakib et al. | 712/22 |

OTHER PUBLICATIONS

Jauhari et al. (Priority-Hints: An Algorithm for Priority-Based Buffer Management); Computer Sciences Technical Report #911; Feb. 1990; 36 total pages.*

Russell et al. (Workflow Data Patterns), Tech. Rep. FIT-TR-2004-01, Queensland Univ. of Techn. (2004); 75 total pages.*

PCGuide (Fragmentation and Defragmentation); Feb. 18, 2005; 2 pages; accessed on Jul. 17, 2015 at https://web.archive.org/web/20050218232032/http://www.pcguide.com/ref/hdd/file/clustFragmentation-c.html.*

Grosskopf, A. "xBPMN—Formal Control Flow Specification of a BPMN based Process Execution Language", No. 6, (Jul. 6, 2007), pp. 1-159.

Khalaf, R. et al., "Maintaining data dependencies across BPEL process fragments", Service-Oriented Computing—ICSOC 2007. Proceedings Fifth International Conference. Lecture Notes in Computer Science, vol. 4749, Aug. 30, 2007, pp. 207-219.

Juric, M. B., "A Hands-on Introduction to BPEL" (Jan. 1, 2005), retrieved on Feb. 7, 2008 from http://www.oracle.com/technology/pub/articles/matjaz_bpel1.html.

Extended EP Search Report for Application No. 08012876.2, mailed Nov. 10, 2008, pp. 1-9.

* cited by examiner

STREAMING OPERATIONS FOR WORKFLOW PROCESS MODELS USING MULTIPLE VIEWS ON A SAME BUFFER

CROSS-REFERENCE TO RELATED APPLICATION

This application claims priority under 35 U.S.C. §119 to Provisional Patent Application 61/017,499, filed Dec. 28, 2007, titled "STREAMING OPERATIONS FOR WORKFLOW PROCESS MODELS," which is incorporated herein by reference in its entirety.

TECHNICAL FIELD

This description relates to workflow process models.

BACKGROUND

Modeling languages may be used as meta-languages to describe and execute underlying processes, such as business processes. For example, process modeling languages allow an enterprise to describe tasks of a process, and to automate performance of those tasks in a desired order to achieve a desired result. For instance, the enterprise may implement a number of business software applications, and process modeling may allow coordination of functionalities of these applications, including communications (e.g., messages) between the applications, to achieve a desired result. Further, such process modeling generally relies on language that is common to, and/or interoperable with, many types of software applications and/or development platforms. As a result, process modeling may be used to provide integration of business applications both within and across enterprise organizations.

Thus, such modeling languages allow a flow of activities or tasks to be graphically captured and executed, thereby enabling resources responsible for the activities to be coordinated efficiently and effectively. The flow of work in a process is captured through routing (e.g., control flow) constructs, which allow the tasks in the process to be arranged into the required execution order through sequencing, choices (e.g., decision points allowing alternative branches), parallelism (e.g., tasks running in different branches which execute concurrently), iteration (e.g., looping in branches) and synchronization (e.g., the coming together of different branches).

In the context of such processes, it may occur that an activity of a process may require (or may benefit from) multiple executions thereof. For example, an activity may be required to perform some repetitive or iterative task, such as checking availability for sale of a list of inventory items and/or requesting re-order of any unavailable inventory items. Existing techniques for handling such situations, additional examples of which are provided herein, include performing "for each" execution of the activity (e.g., performing multiple activations of the activity for each data item to be processed), or spawning/executing multiple instances of the activity to be executed substantially in parallel with one another (again, with each instance processing one or more of the data items to be processed).

Thus, it may occur that a plurality of data items may need to be processed (e.g., read and/or generated) by an activity of a process model (e.g., during execution of the activity). In practice, existing techniques for performing such processing may be inefficient, unsuitable, inflexible, or unfeasible for many scenarios. For example, activating the activity multiple times, once for each data item to be processed, may be inefficient. As another example, the activity may require (or benefit from) a high level of flexibility in the manner(s) in which the activity processes the data items, including, for example, processing some desired subset of the data items, or having the ability to forgo processing any of the data items, if the circumstances warrant. Consequently, existing solutions for processing multiple data items of a list may not be sufficient to achieve a desired result in a desired manner.

SUMMARY

According to one general aspect, a system may include a buffer configured to store a plurality of items, and configured to be accessed by one or more activities of an instance of a process model, and a scheduler configured to schedule execution of each of a plurality of activities of the process model, and configured to determine an activation of an activity of the plurality of activities. The scheduler may include an activity manager configured to access an activity profile of the activity upon the determining of the activation, the activity profile including buffer access characteristics according to which the activity is designed to access the buffer. The system may include a process execution unit configured to execute the activity, and the process execution unit may include a buffer access manager configured to access the buffer according to the buffer access characteristics of the activity profile, and to thereby facilitate an exchange of at least one item between the buffer and the activity during the execution of the activity.

According to another general aspect, a computer program product may be used for executing process models, the computer program product being tangibly embodied on a computer-readable medium and including executable code that, when executed, is configured to cause at least one data processing apparatus to associate an activity profile with an activity of a process model, the activity profile including buffer access characteristics according to which the activity is designed to exchange data with a buffer storing data items associated with the activity, define a control flow activation of the activity to occur during execution of an instance of the process model, and define a data flow of the data items to occur between the buffer and the activity during the execution, in terms of the buffer access characteristics.

According to another general aspect, a method may include determining an activation of an activity of a process model, accessing an activity profile of the activity, the activity profile including buffer access characteristics according to which the activity has been designed to access a buffer configured to provide access to a list of data items, generating a state model for the activity, based on the activity profile, executing the activity based on the state model, and accessing the buffer to exchange at least one data item between the buffer and the activity, based on the buffer access characteristics.

The details of one or more implementations are set forth in the accompanying drawings and the description below. Other features will be apparent from the description and drawings, and from the claims.

DETAILED DESCRIPTION

Figure 1:
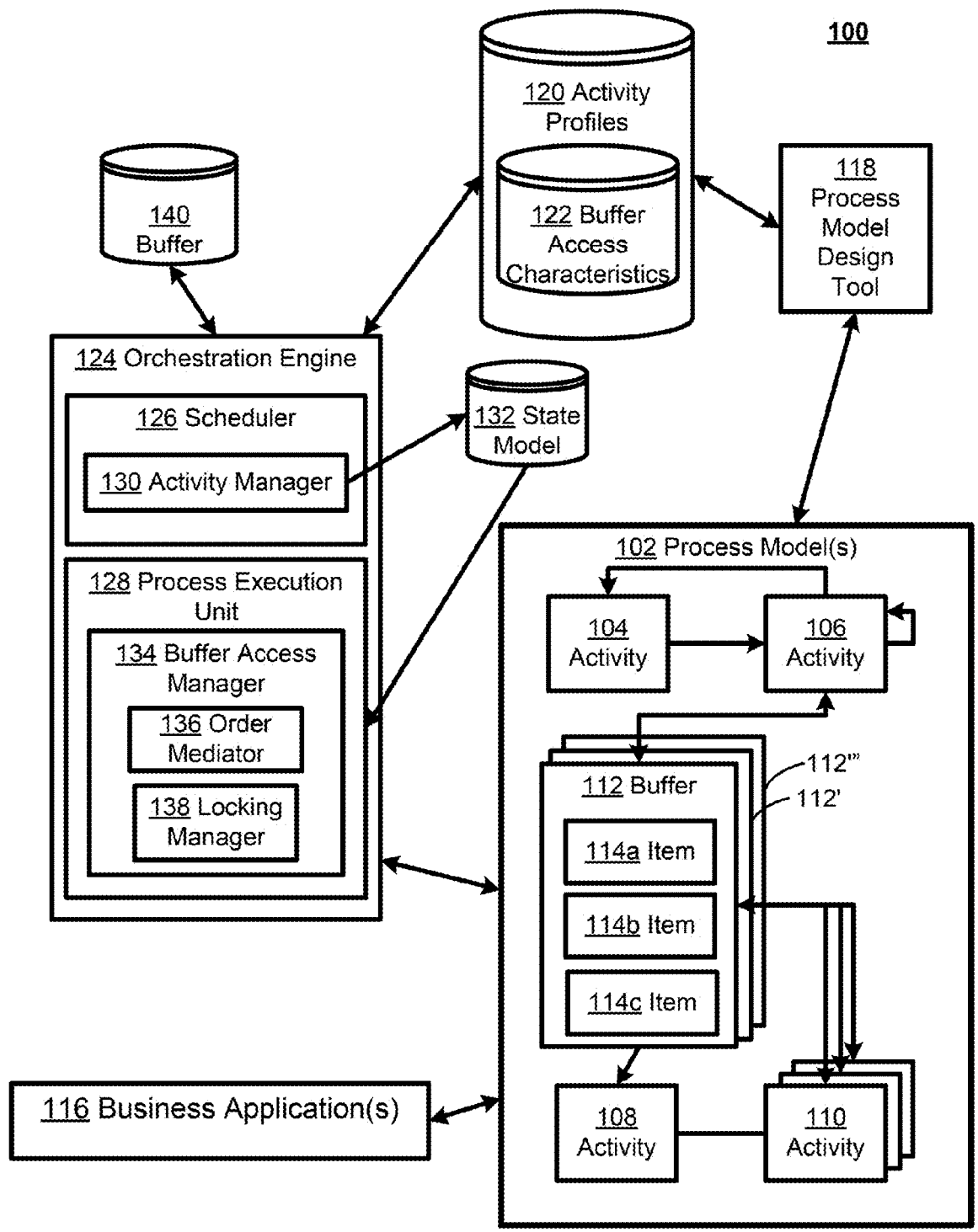
FIG. 1 is a block diagram of a system for streaming operations for process models.

FIG. 1 is a block diagram of a system 100 for streaming operations for process models. For example, a process model 102 may include activities 104, 106, 108, and 110. Some or all of the activities 104-110 may access a buffer 112 that stores data items 114a, 114b, 114c. As will be appreciated, the process model 102 is intended as a conceptualization or representation of a portion of one or more process models, in order to provide several illustrative but non-limiting ways in which an activity of a process model may access a buffer, such as the buffer 112. In particular, as described in more detail below, the activities 104-110 may access the buffer 112 in a flexible and efficient manner(s).

For example, the activity 106 may stream some or all of the items 114a-114c to the buffer as part of an output of the activity 106, where successive items are appended to one another within the buffer 112 (e.g., as opposed to overwriting past or current contents of the buffer 112). Conversely, one or more of the data items 114a-114c may be streamed in from the buffer 112 to the activity 106, where such streaming in may process multiple ones of the data items 114a-114c (and other data items, not illustrated in FIG. 1 for the sake of brevity), such as when two data items are streamed out from the buffer at a time. Further, such streaming operations may be combined such that, for example, the activity 106 streams in items 114a-114c from the buffer 112, performs some transformation of the streamed data items, and then streams back the transformed data items to the buffer 112 for storage therein (e.g., for overwriting of the previously streamed in items).

As described in detail below, such example interactions between the activity 106 and the buffer 112 may occur based on a control flow activation or trigger of the activity 106 relative to the buffer 112, and thus without requiring data flow to occur between the buffer 112 and the activity 106 in order to commence or conduct any of the streaming operations just described. In other words, for example, activation of the activity 106 may occur independently of, or decoupled from, an actual data flow(s) between the activity 106 and the buffer 112.

For example, if the activity 104 is associated with customer orders, and the activity 106 is associated with checking inventory to ensure that the customer orders may proceed, then the buffer 112 may store items 114a-114c as including possible inventory items. Thus, for each iteration of the illustrated loop(s) of activities 104, 106, the activity 106 may stream in one or more data items 114a-114c (and may write back corresponding data items marked so as to designate that a customer has ordered the underlying inventory item in question).

Consequently, for example, the activity 106 may need to be activated only once in order to then read each of the items 114a, 114b, 114c (e.g., together or line-by-line). Conventional systems, on the contrary, require receipt/triggering by an arrival of one or all of the data items 114a-114c for the activity 106, e.g., as the data items 114a-114c become available. In fact, it may occur that the activity 106 in the system 100 does not access the buffer 112 at all, if such a need is determined not to exist, and yet the process model 102 may proceed past the activity 106 nonetheless. Thus, the system 100 provides for very flexible and efficient implementations of the process model 102 in which one or more activities are designed to process a list of data items of the buffer 112, or other buffers.

It will be appreciated by one of ordinary skill in the art, and based on the above discussion, that the process model 102 may be designed to implement one or more business application(s) 116. In this regard, the business application 116 should be interpreted broadly as including virtually any application that is used in profit generation of some sort, although the business application 116 also may refer to non-profit endeavors as well, including, for example, schools, churches, charities, hospitals, or virtually any other organization. Further, the business application 116 is merely an example, and other applications, such as applications for personal use, also may be used.

Although not specifically illustrated in FIG. 1, it will be appreciated by one of ordinary skill in the art that the process model 102 may thus serve as a basis for joining and implementing multiple ones of the business application(s), in order to obtain a larger, desired result. Such techniques may be referred to as occurring within a Service Oriented Architecture (SOA) in which new and/or existing applications are joined together to obtain the larger result, both within and across multiple organizations/entities. In this regard, the process model 102 may join together one or more services having one or more specific functionalities that are exposed to other applications, often over a network (e.g., the Internet) by way of a service interface (where an operation and use of the interface may be known or determined, as needed). When such a service (and/or an interface of the service) is exposed/available over the World Wide Web (referred to herein as the WWW or the web), then the service may be known as a web service.

When, for example, operations of the process model 102 are conducted within and among different organizations/entities, one or more activities 104-110 of the process model 102 may be associated with executing message exchanges, e.g., with a corresponding process model(s) of the partner organization(s). Consequently, although not specifically illustrated in FIG. 1, the system 100 may be associated with corresponding conventional messaging components, such as, for example, a message transmitter/receiver, a message handler, a message log, and/or a message repository. Other features and example uses and advantages of the system 100 are described herein, or would be apparent to one of ordinary skill in the art.

Further in FIG. 1, a process model design tool 118 represents one or more software tools that allow a designer of the process model 102 to achieve a desired effect during execution of the process model 102, e.g., with respect to the buffer 112. For example, the process model design tool 118 may include one or more graphical user interface(s) (GUIs) which allow the designer, for example, to graphically arrange and configure blocks or other defined shapes in order to create the process model 102 as having desired activities and control flow constructs.

The GUI or other feature of the process model design tool 118 also may allow the designer to input desired characteristics of the process model, e.g., characteristics of one or more activities of the process model 102. In FIG. 1, such features are illustrated by inclusion of activity profiles 120 associated with activities 104-110, where the activity profiles 120 may include buffer access characteristics 122, according to which one or more of the activities 104-110 may be controlled to access the buffer 112.

In practice, the process model designer may use one or more of a number of known languages to design and construct the process model 102. In the examples that follow, the modeling language Business Process Modeling Notation (BPMN) is used as an example of a language that developers and designers may use as a basis to create the process model 102. As is known, BPMN provides intuitive, graphical interfaces, with which designers (even nontechnical or business designers) may easily create the process model 102. Thus, the functionalities described herein with respect to the system 100 may be implemented, for example, as extensions or modifications of BPMN, or may be implemented in the context of an entirely new or different language(s) that is designed to provide the described functionalities.

Once the process model 102 is designed using the process model design tool 118, the process model 102 may be stored in an appropriate memory (not shown in FIG. 1, although it will be appreciated that such a memory may be used to store the process model 102 in conjunction with, or including, the activity profiles 120). That is, a generic version of the process model 102 may be stored for later instantiation of, and execution by, an orchestration engine 124.

In general, the orchestration engine 124 may implement a number of conventional functions related to instantiating, executing, or otherwise processing the process model 102. For example, upon request by a user of the process model 102, the orchestration engine 124 may spawn at least one instance of the process model 102, where such instances may be essentially identical to one another, or may be varied and individualized based on various factors, such as, for example, an identity and authorization level of the user.

Once instantiated, the orchestration engine 124 may proceed with processing the instance of the process model 102. For example, in general, the orchestration engine 124 may be responsible for scheduling an occurrence(s) of the activities of the process model 102, and for ensuring that prior activities of the process model 102 may be completed before allowing subsequent activities to begin. The orchestration engine 124 also may interpret and process the various control flow constructs (not shown in FIG. 1) that may be present in the process model 102, such as, as referenced above, splits, joins, or synchronizations of branches of activities of the process model 102.

The orchestration engine 124 performs these and other functions by processing the process model 102 using one of a number of execution languages. For example, the Business Process Execution Language (BPEL) is designed to be executed by the orchestration engine 124. Accordingly, BPEL or other such languages (such as, for example, the Web Services Flow Language (WSFL), the eXtensible language (XLANG), and/or the Business Process Modeling Language (BPML)), or modifications/extensions thereof, may be used to execute or otherwise process the process model 102 (as previously expressed, for example, by BPMN and/or extensions/modifications thereof, or as expressed by some other suitable process model design language) within the orchestration engine 124.

Thus, the orchestration engine 124 may include a scheduler 126 that is responsible for scheduling an occurrence of a next activity of the process model 102. For example, the scheduler 126 may determine that the activity 108 is completed and is ready to provide its output to the activity 110 (where the activity 110 is illustrated as having multiple instances, as described in more detail, below). Then, the scheduler 126 may schedule the occurrence of the next activity, e.g., in this example, the (instances of) the activity 110. Further description of operations of the scheduler 126 is provided below, although it will be appreciated that inasmuch as conventional functions of components such as the scheduler 126 are known in the art, such conventional functions are not described here in detail, except as may be useful to understand the operations of the system 100.

Once an activity is scheduled, a process execution unit 128 of the orchestration engine may proceed with executing the scheduled activities. For example, if the activity 108 includes sending a message to a partner organization, and is scheduled to occur at a certain time, then the process execution unit 128 may determine that the scheduled time has been reached, and may cause the message to be sent (e.g., by way of an appropriate messaging infrastructure, as referenced above). The process execution unit 128 also may perform whatever logic is required to execute control flow constructs of the process model 102 (not shown in FIG. 1), but possibly including, as already referenced, various splits, joins, synchronizations, or other control flow constructs. As with the scheduler 126, conventional functions of the process execution unit 128 are not described further in detail, except as necessary or helpful to understand the operation of the system 100; however, such conventional functions are known and would be apparent to one of ordinary skill in the art.

In the system 100, the scheduler 126 includes an activity manager 130. Upon scheduling of an activity (e.g., the activity 106), the activity manager 130 may be configured to inspect the scheduled activity to determine the relevant activity profile(s) 120, including buffer access characteristics 122. As described herein, the activity profile information generally refers to any information useful by the scheduler to schedule the activity for execution, such as, for example, when the activity should (or should not) be scheduled, how the activity should be handled in case of an exception or other error in the execution thereof, or how the activity should behave if cancelled or completed.

Figure 4:
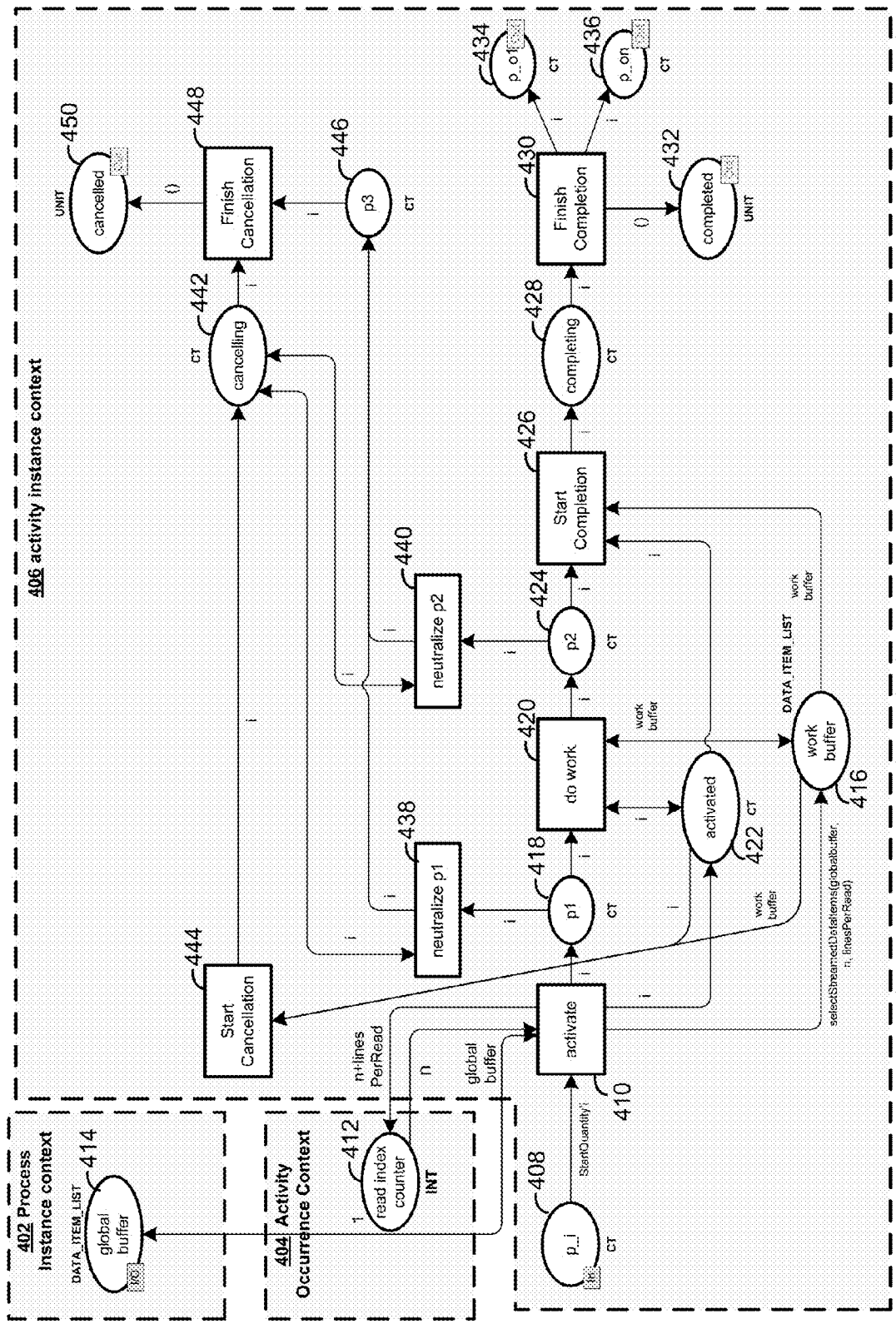
FIG. 4 is a block diagram illustrating a colored Petri net representation of a first example streaming operation of the system of FIG. 1.
Figure 5:
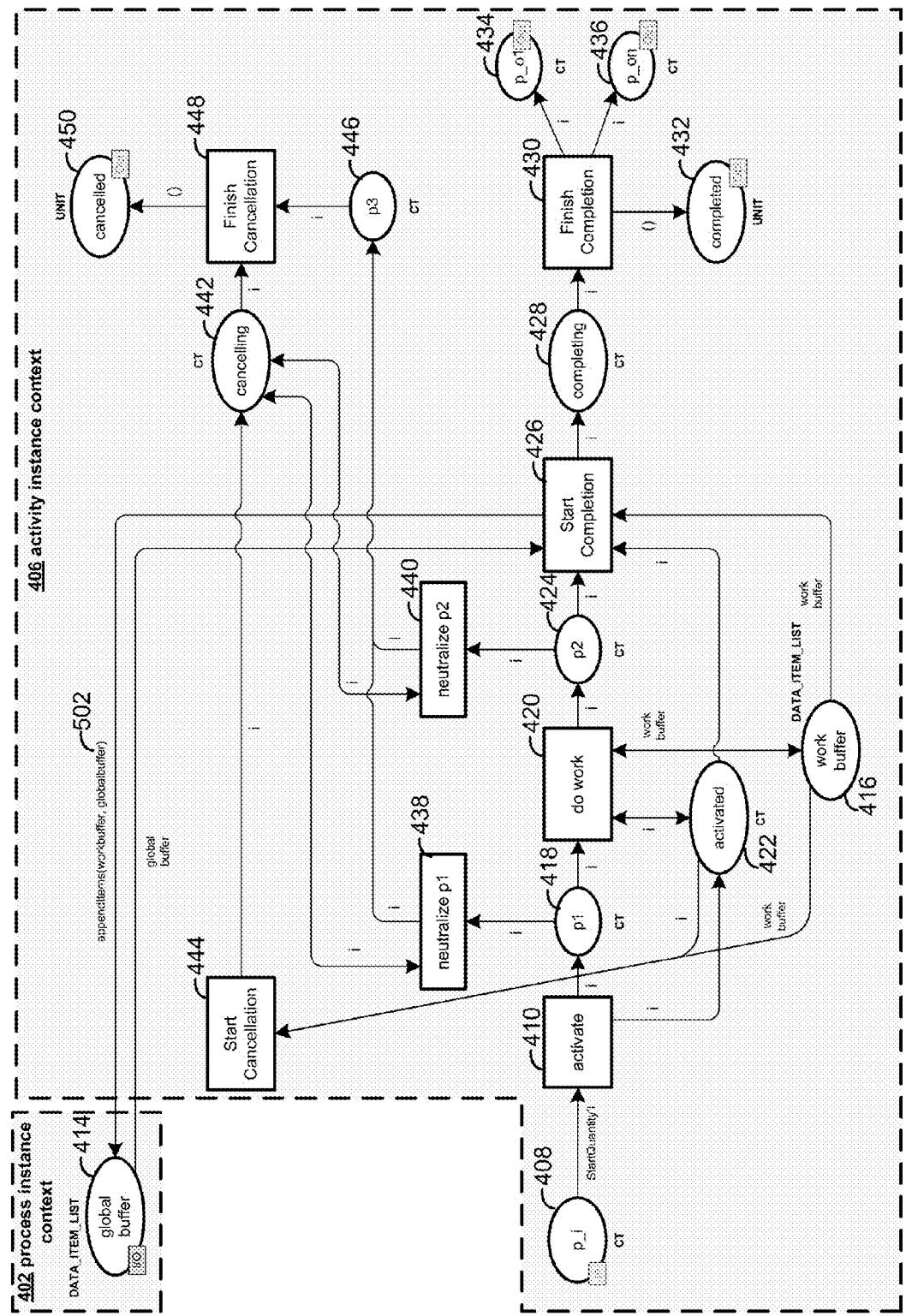
FIG. 5 is a block diagram illustrating a colored Petri net representation of a second example streaming operation of the system of FIG. 1.
Figure 6:
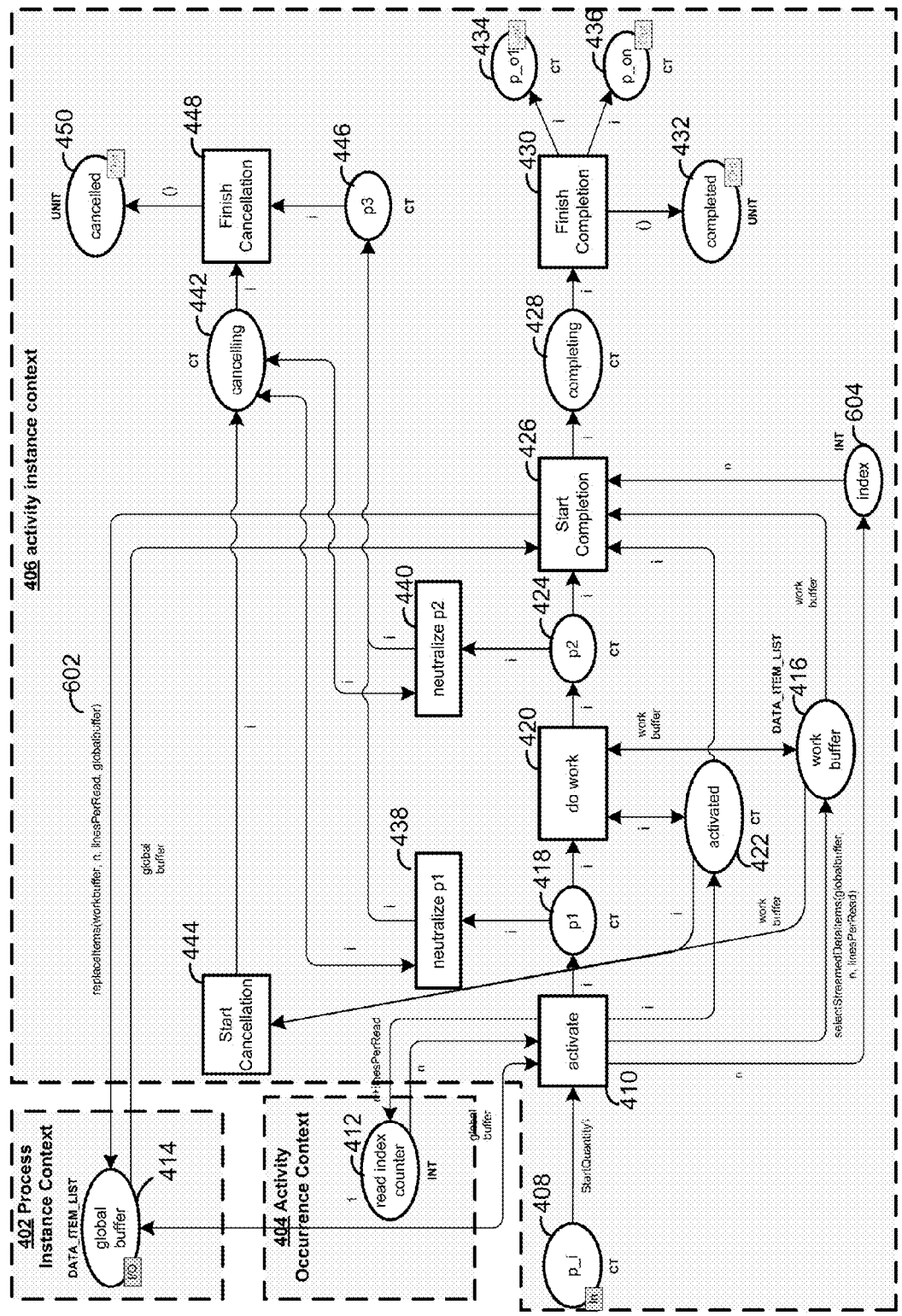
FIG. 6 is a block diagram illustrating a colored Petri net representation of a third example streaming operation of the system of FIG. 1.

As shown, some or all of this information may be expressed using a state model 132 for the activity in question. For example, as shown in FIGS. 4-6, such a state model may be expressed using colored Petri nets (CPNs), and may provide information to the process execution unit 128 codifying how the activity in question should be executed or otherwise processed.

The buffer access characteristics 122 may specify or refer to virtually any manner in which the activity in question (e.g., the activity 106) should, may, or must access the buffer 112. For example, the buffer access characteristics 122 may specify whether the activity 106 should read from, write to, or modify (i.e., read, transform, and re-write) the contents of the buffer 112. Further, the buffer access characteristics 122 may specify the manner(s) in which these or other operations may occur. For example, reading from a ten item list of the buffer 112 may be specified to occur one line (item) at a time, or five items at a time, or may process all ten items at once. As yet another example, the buffer access characteristics 122 may specify that the activity 106 should not access the buffer 112 if certain circumstances exist at a time of the activation of the activity 106. These and other buffer characteristics may be explicitly or implicitly included in the state model 132.

During execution by the process execution unit 128, a buffer access manager 134 may be configured to control and execute the manner(s) in which the activities of the process model 102 interact with the buffer 112, e.g., may implement the activity in question based on the buffer access characteristics 122. In addition to the examples just provided, the buffer access manager 134 may be configured to, for example, generate a temporary or working buffer that may store a first subset of data items from the buffer 112 that may be needed by a particular activity, and may generate another such working buffer storing a second subset of data items that may be needed by another activity. Thus use of such working buffers is described in various examples below, e.g., with respect to FIGS. 4-6, and it will be appreciated that these and other optimizations of the system 100 may occur in order, for example, to increase an efficiency or speed with which the activities 104-110 may access the buffer 112.

The buffer access characteristics 122 may specify an order in which one or more of the activities may access the items 114a-114c of the buffer 112, and an order mediator 136 may be configured to implement a specified order. For example, items 114a-114c may be accessed in a first-in-first-out (FIFO) or last-in-last-out (LIFO) order. In other implementations, the order mediator 136 may provide the items 114a-114c in a more complex ordering scenario(s). For example, the items 114a-114c may be ordered according to characteristics of the data items, such as, for example, some defined priority level associated with one or more of the data items 114a-114c. For example, if a high-priority data item is received, then the order mediator 136 may ensure that this high-priority data item is read from the buffer 112 first by the activity 106, even though the activity 106 may otherwise be implementing a FIFO scheme.

In a more specific example(s), when streaming out from the buffer 112, e.g., to the activity 106, it may be necessary or desirable to stream the data items 114a-114c in a particular order. For example, the order mediator 136 may receive the data items 114a-114c, which may initially have a LIFO ordering within the buffer 112, and may reorder the data items 114a-114c for inclusion in an ordered, secondary buffer 112', where the order may be determined based on the buffer access characteristics for the one or more activities which need to perform streaming operations. Thus, during execution of an activity instance of an instance of the process model 102, the order mediator 136 may be associated with (e.g., may map to) one or more activities, and may provide a new, reordered buffer 112' (data object) that serves as the actual streaming source for the one or more activities (or instances thereof).

Consequently, the order mediator 136 provides for virtually any desired type of ordering, including multiple ordering views on the same buffer 112. For example, the order mediator may provide a first reordered buffer 112' in which the data items 114a-114c are ordered for the activity 106 according to an associated due date or delivery date of an associated project or product(s) for sale. Meanwhile, the order mediator 136 also may define another reordered buffer 112'' in which the data items 114a-114c are ordered for the activity 110 (or instances thereof) according to a date on which the associated project(s) were assigned, or according to a date of production of the product(s) for sale. Thus, the contents 114a-114c of the buffer 112 may be streamlined into different activities using different orderings. That is, the items may be streamed in a different order to the activities.

Further with regard to FIG. 1, and as referenced above, the system 100 permits the activities 104-110 to read from, transform, and then write to, the buffer 112, which may be referred to as a copy-back operation. Since, as shown, multiple activities may access the buffer 112 concurrently, it may occur that two or more activities access a particular data item(s), such as the data item 114a, for modifying and re-writing back to the buffer 112. In order to ensure that such copy-back operations do not result in inconsistent modifications of the data item(s) in question (e.g., if the activity 106 and the activity 108 were both to concurrently read the item 114a, perform some modification thereof, and then attempt to re-write the separately and differently modified data item 114a), a locking manager 138 may be configured to ensure that the data item(s) in question are not checked out by a second activity until a return of the modified data item has been executed by a first activity.

Finally in FIG. 1, a buffer 140 is illustrated that may represent, for example, a memory that may be used to store the buffer 112, which itself may represent a data object, which may be, e.g., created by the process execution unit (e.g., during instantiation of the process model 102). As described herein, the buffer 112 may be a global buffer that is globally available to all activities of a particular instance of the process model 102, or may represent a buffer that is available only to particular activities of the process model 102 (for example, as with the working buffer(s) referenced herein). In the latter case, the buffer 140 may represent the global buffer for the instance of the process model in question. In other implementations, the buffer 140 may represent a memory or data object that acts as a buffer for more than one instance of the process model 102, or for more than one process model.

Thus, the system 100 provides for flexible, efficient use of the buffer 112 and similar buffers. As described, multiple activities (or instances of activities) may access the buffer 112 concurrently, based at least in part on a control flow-based activation of the buffer 112 and of the activity in question. As a result, each activity (or activity instance) may need to be activated by control flow only once in order to execute a number of different access operations with respect to the buffer 112.

For example, the activity 106 is illustrated as including an inner loop in which some operation(s) is performed repetitively (e.g., as long as some condition exists), and an outer loop in which the activity 104 receives an output from the activity 106 and then provides further input to the activity 106. In such loops, buffer access may occur in a stateful manner, meaning, for example, that the buffer access manager 134 may maintain a state of a current/previous buffer access operation by an activity or activity instance, so that a subsequent activity or activity instance may access the buffer 112 in an optimal manner.

For example, if the activity 106 has buffer access characteristics which specify that the activity 106 should "read the next five items from the buffer 112," then a first execution of the activity 106 may read the first five items (e.g., items 114a-114e, not all shown in FIG. 1) from the buffer 112, so that a second execution of the activity 106 should then read the next five items (e.g., items 114f-114j, not shown in FIG. 1) from the buffer 112. Thus, the buffer access manager 134 may use an index counter, as described below (e.g., with respect to FIG. 4) in order to access the buffer 112 at a desired buffer location.

Similar comments apply to the activity 110, which is illustrated as a multiple instance activity so that multiple executions of the activity 110 may proceed in parallel with one another. In this case, the buffer access manager 134 may again maintain a counter so that, for example, a second instance of the activity 110 may begin processing data items from the buffer 112 that have not already been processed by a first instance of the activity 110.

Although various operations and features have been described with respect to the system 100 of FIG. 1, it may be appreciated that many other variations, not necessarily discussed herein, also may be implemented. For example, although the buffer 112 and other buffers described herein may be described as including data items, e.g., 114a-114c, it may be appreciated that the buffer(s) may actually contain a pointer or other reference to data; e.g., the buffer 112 may include pointers to actual data that may be stored in the buffer (memory) 140. Other variations and implementation details would be apparent to those of skill in the art.

Further, although terminology has been selected to describe the system 100, and such terminology is used consistently herein, it may be appreciated that the same or similar components may be referred to using different terminology. For example, the scheduler 126 and/or the activity manager 130 may be referred to as an activity handler and/or activity inspector. Similarly, the orchestration engine 124 may be referred to in other contexts as a workflow engine, or as a process execution engine. Thus, the presently-used terminology should not be construed to be limiting in terms of the functions of the illustrated components, or of similar components.

Somewhat similarly, the illustrated configuration of the system 100 is merely illustrative, and not limiting. For example, in some implementations, it may occur that functions of some components may be executed, at least in part, by other components of FIG. 1. For example, some functions of the scheduler 126 may be considered to be implicitly or explicitly performed by the buffer access manager 134 (e.g., the order mediator 136 may assist in determining a portion of the state model 132 related to ordering operations for accessing the buffer 112).

Moreover, the components may be executed in different configurations than those shown in FIG. 1. For example, the orchestration engine 124 may run on a single computing device, or may have its functionality distributed among several computing devices, e.g., over a network. Similarly, the process model design tool 118 may be packaged and implemented with the orchestration engine 124 (e.g., on the same computing device(s), or in the same software package(s)), or may be implemented separately from (but compatible with) the orchestration engine 124.

Many other variations of the system 100, and similar systems, may be implemented, some of which are described herein.

Figure 2:
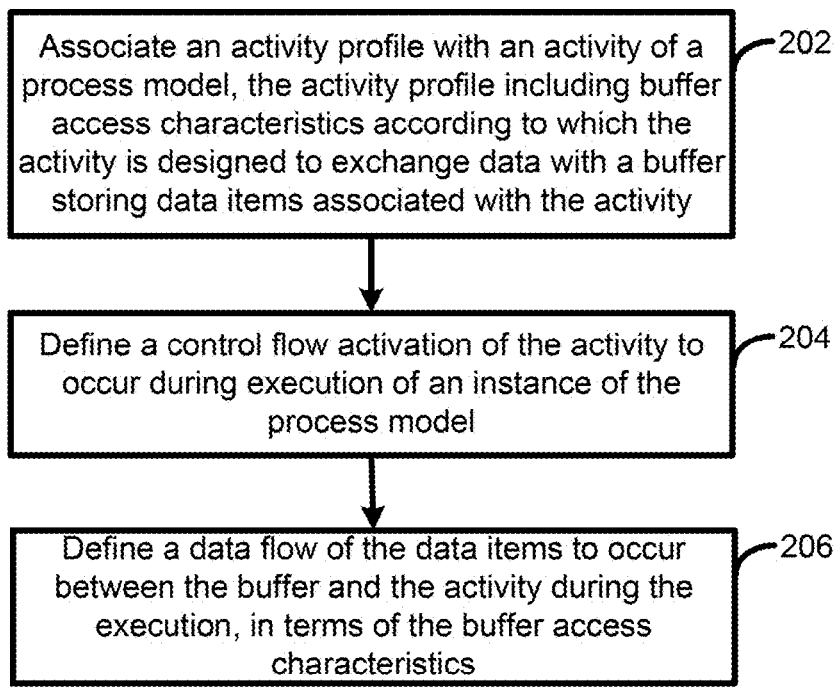
FIG. 2 is a flowchart illustrating first example operations of the system of FIG. 1.

FIG. 2 is a flowchart 200 illustrating first example operations of the system of FIG. 1. For example, FIG. 2 generally illustrates operations associated with the process model design tool 118 of FIG. 1.

In FIG. 2, an activity profile may be associated with an activity of a process model, the activity profile including buffer access characteristics according to which the activity is designed to exchange data with a buffer storing data items associated with the activity (202). For example, the process model design tool 118 may be used to receive design characteristics for the process model 102, e.g., from a process model designer and through a graphical user interface through which BPMN code may be generated, as described above. For example, the process model design tool 118 may provide a generic activity template to the designer, and may receive the activity profile in association with a design of the generic activity template for inclusion in the process model 102. As appreciated from the above description, the process model design tool 118 also may receive the buffer access characteristics 122, specifying whether, when, and how the activity may access (e.g., read from and/or write to) one or more buffers, such as the buffer 112.

A control flow activation of the activity to occur during execution of an instance of the process model may be defined (204). For example, the process model design tool 118 may be configured to receive a desired control flow for the process model 102 from the designer (e.g., as the designer selects and graphically arranges and connects the activities as represented by appropriate boxes or other graphical elements). Then, the process model design tool 118 may determine or otherwise define a manner in which the activity in question is activated during (later) execution of the process model instance, e.g., when and how the activity is scheduled by the scheduler 126 of the orchestration engine 124. For example, the activity 106 may be defined and associated with a control flow in which completion of the activity 104 as determined by the orchestration engine 124 triggers a control flow activation of the activity 106, e.g., in which the activity 106 is placed into an active state in which the activity may interact with the buffer 112.

A data flow of the data items to occur between the buffer and the activity during the execution may be defined, in terms of the buffer access characteristics (206). For example, the process model design tool 118 may be configured to define the data flow between the activity 106 and the buffer 112, based on buffer access characteristics 122 that specify, for example, that the activity should read a specified number of data items at a time from the buffer 112, or that the activity should be associated with a temporary or working buffer that stores data items specific to the activity 106 during a time in which the activity 106 is active.

FIG. 2 and the above description are not intended to provide an exhaustive explanation of how the process model design tool 118 may be used to provide the process model 102 and associated activity profiles 120 and buffer access characteristics 122, nor should the operations 202-206 be construed to be required to be performed in the order shown.

Figure 3:
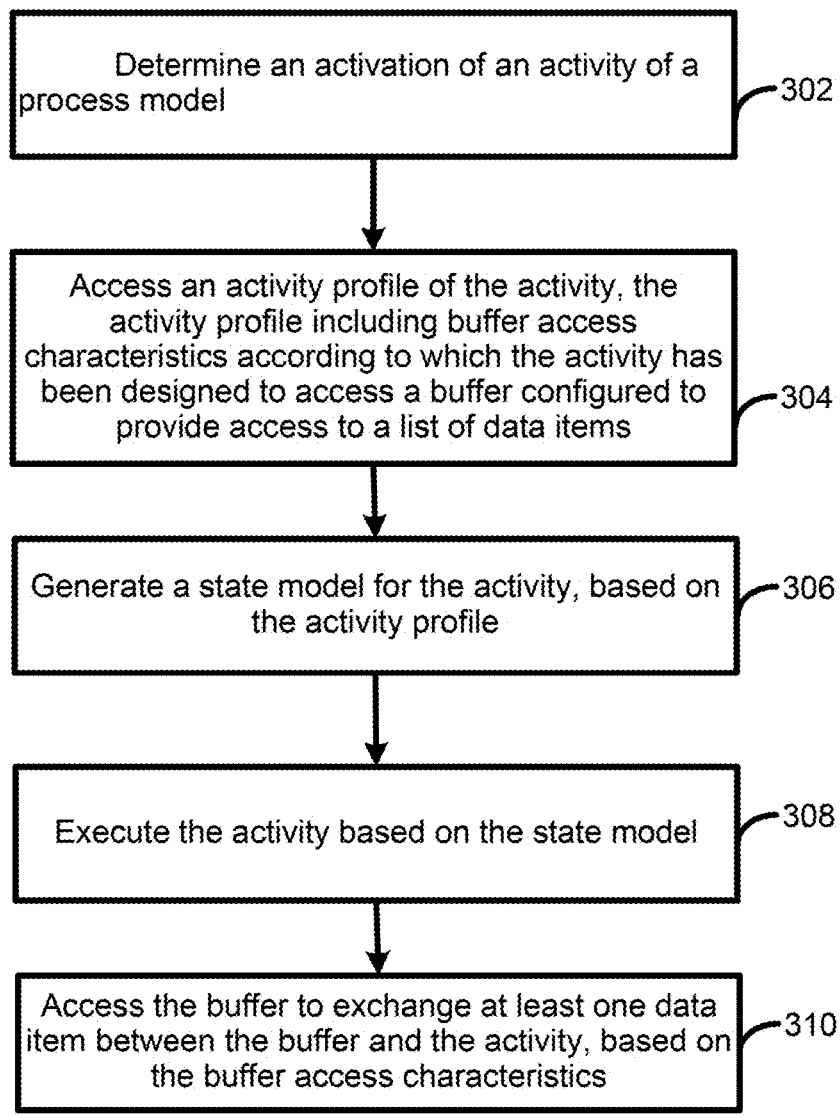
FIG. 3 is a flowchart illustrating second example operations of the system of FIG. 1.

FIG. 3 is a flowchart 300 illustrating second example operations of the system of FIG. 1. In the example of FIG. 3, an activation of an activity of a process model may be determined (302). For example, the orchestration engine 124, e.g., the scheduler 126, may determine that a previous activity or control construct has completed, e.g., has passed a data output to the input of the activity in question. For example, the scheduler 126 may determine that the activity 104 has completed and may thus activate the activity 106, so that the activity 106 is in a state in which the activity 106 may be executed, even though the activity 106 may not actually be executed until the scheduled time/event occurs.

An activity profile of the activity may be accessed, the activity profile including buffer access characteristics according to which the activity has been designed to access a buffer configured to provide access to a list of data items (304). For example, the activity manager 130 may access the activity profiles 120, including the buffer characteristics 122, to thereby obtain information regarding the activity in question (e.g., the activity 106).

A state model may be generated for the activity, based on the activity profile (306). For example, the activity manager 130 may generate the state model 132, which may be represented, for example, as a CPN, such as the CPN's of FIGS. 4-6. The state model 132 explicitly or implicitly includes some or all of the activity profile 120 and the buffer access characteristics 122.

The activity may be executed, based on the state model (308). For example, the process execution unit 128 may execute the activity in question, e.g., the activity 106, including, for example, sending or receiving a message, updating a value, searching a database, or performing some other activity-related function.

The buffer may be accessed to exchange at least one data item between the buffer and the activity, based on the buffer access characteristics (310). For example, the buffer access manager 134 may execute an exchange of a data item between the buffer 112 and the activity 106, which may include one or both of a stream-in and/or stream-out operation from/to the buffer 112 and to/from the activity 106.

As with FIG. 2, the flowchart 300 of FIG. 3 merely provides example implementations of the system 100 of FIG. 1, and should not be construed to be limiting in terms of included or excluded operations, or in terms of the possible sequence(s) of the operations.

FIG. 4 is a block diagram illustrating a colored Petri net (CPN) representation of a first example streaming operation of the system of FIG. 1. More particularly, the CPN of FIG. 4 represents an example of the state model 132 of FIG. 1, illustrated in FIG. 4 as state model 132a, in which the data items 114a-114c are streamed from the buffer 112 to one of the activities 104-110 (or instances thereof).

In general, a Petri net refers to a known modeling language or technique in which arcs (direct arcs) may run between "places" and "transitions," where the transitions are referred to as having either "input places" (if leading to a transition by way of an arc) or "output places" of the transition (if receiving an arc from a transition). As is known, such Petri nets may be used to model actions associated with workflow processing. In this case, the places of the Petri net (which may be represented as ellipses) may contain tokens (where, in BPMN/BPEL, and in other contexts and languages, activation of branches or activities may be referenced or described as passing or routing a token(s), such as just referenced), so that transitions (which may be represented as rectangles or boxes) may be said to respond to input tokens by "firing," where an enabled transition may fire if there are tokens in each input place of the transition. When firing, a transaction uses tokens from its input places, executes any associated processing, and puts tokens into the various output places. In standard Petri nets, such tokens are indistinguishable from one another, while colored Petri nets provide an extension in which each token has a specific value, where such values may be used to base expressions and make decisions.

In the example of FIG. 4, and with reference to FIG. 1, the CPN 132a illustrates a state model for stream-in operations of the system 100 which may allow an activity to read lines (items) of the buffer 112 into an input parameter of the activity in question, e.g., reading from the buffer line-by-line (i.e., item-by-item) (as opposed to a conventional reading operation of BPMN, in which, for example, such a reading operation may use the entire list (i.e., buffer content) as an input to the activity in question).

As described, in the system 100 and as described below with reference to FIG. 4, when a stream-in operation is activated by control flow of the system 100, the next "n" lines of the buffer 112 may be streamed into a defined input parameter of an activity in question, so that there may need to be separate reading streams in case of multiple activity occurrences streaming from the (same) buffer 112. Thus, each such activity occurrence reading from the buffer 112 may be associated with an index counter representing a current read position within the buffer 112; i.e., the buffer access manager 134 may be stateful in that, for example, it may preserve the state between the stream-in operations that have been triggered by control flow activations of different activity instances of the same activity (e.g., instances of the activity 110, as shown in FIG. 1).

FIG. 4 illustrates the above and related concepts using 3 primary partitions, i.e., a process instance context 402, an activity occurrence context 404, and an activity instance context 406. Each of the partitions 402, 404, 406 represent the context of their respective operations. For example, contents of the process instance context 402 may be available once per instance of the process model 102 as a whole. Thus, for example, alteration of a place(s) in the partition 402 will affect all other components accessing the same place(s) within the process model instance.

Meanwhile, places of the activity occurrence context 404 may be available per occurrence of an activity (e.g., per occurrence of the activity 106, or per occurrence of instance(s) of the multiple instance activity 110). That is, since it is possible that a process instance may have different activity instances for the same activity, it is desirable to be able to express the actual occurrence of an activity per process instance. More specifically, the term activity occurrence may refer to the actual activity once per process instance. Thus, if a property is defined per activity occurrence, this means that each activity instance of the same activity inside the same process instance shares this particular property. On the other hand, a property of an activity model would be like a singleton amongst all activity instances.

Meanwhile, places of the activity instance context 406 may be available per instance of the activity in question. For example, an input place p_i 408 within the activity instance context may output a token of a certain color type (CT), which may result in an activation 410 of the activity instance in question, identified in FIG. 4 by the instance designator "i." In general, a start quantity may imply a requirement of one or more than one signal/token to cause the activate transition 410 to be enabled. Nonetheless, it may be appreciated from the description herein that the enablement of the activity transition 410 is not dependent on an activation of, or dataflow to/from, a buffer from which streaming will occur (such as the buffer 112, or, in FIG. 4 a global buffer 414 in the process instance context 402 and/or a work buffer 416 in the activity instance context 406).

Upon enablement of the activate transition 410, a number "n" of lines/items to be read per stream-in operation may be specified, and the activate transition 410 may receive in return a current value of a read index counter 412 (i.e., specifying a most-recently streamed buffer item(s)/line(s)). That is, as referenced herein, previous occurrences of the activity in question (e.g., other activity instances) may already have read some subset of lines/items from the global buffer place 414, so that the occurrence of the present activity instance should begin where the previous stream-in operation ended.

More specifically, the place global buffer 414 may represent a particular data object (with a maxCardinality larger than 1) that may be used as the input buffer for the activity that the data is being streamed into. The place global buffer 414 may contain a single token of the type DATA ITEM LIST, which represents a list of items (or subitems) of the data object. As just described, the stream-in operations (e.g., of the buffer access manager 134) is stateful per activity occurrence, so that this state is stored through the place read index counter 412. The value of the token in the place read index counter 412 determines at which position inside the global buffer 414 the next read should occur by the spawned activity instance "i."

The activate transition 410 may thus read in the corresponding items from the global buffer 414, which may then be used to create the work buffer 416. That is, upon activation, the specified amount of items (linesPerRead) is copied from the global buffer 414, e.g., by a function referenced in FIG. 4 as "select-StreamedDataItems" and put into the work buffer 416 as a list token. Consequently, the data items may be copied into the context of the activity instance. Moreover, the read index counter 412 may then be increased by a value equal to "linesPerRead" to reflect the results of these operations.

A place p1 418 represents completion of the activate transition 410 and a ready condition of a transition "do work" 420, which represents whatever action(s) are to be performed by the activity instance, such as streaming in from the work buffer 416, and performing some other function(s), such as sending a message to a separate workflow, or performing some calculation with, or transformation of, the streamed in data items from the work buffer 416. The place activated 422 represents that these functions have been scheduled by the scheduler 126 (e.g., have been put into a run list of the scheduler 126 to allow the process execution unit 128 (e.g., when the scheduled time arrives) to do the referenced work/functionality).

A place p2 424 represents finishing of the work and thus a corresponding token may be received at a start completion transition 426. Some of the resulting completion functions are conventional and not described here in detail, but in general it may be appreciated that such completion may include various housekeeping tasks such as notifying other activities of the completion, and/or flushing some or all of the state model 132a in order to make room in a memory for subsequent state models to be stored/accessed. In particular, the place completing 428 may enable a transition finish completion 430, which results in various possible output places 432, 434, and 436, which are associated with passing tokens as notification(s) to other activities or activity instances, and/or to the scheduler 126, that the current activity instance has completed. The completion may also include flushing of the work buffer 416.

In addition to such a successful completion of the activity instance, it may occur that the activity instance may need to be cancelled before completion occurs. For example, a user of the process model 102 may determine that the process model instance was created in error, or is operating on erroneous data, or may determine that there is no longer a need for the activity instance to complete (e.g., due to changed circumstances since a beginning of the activity instance).

As with the completion functions, such cancellations may include a number of conventional techniques that are not described here in detail. In general, though, such cancellation may include activation of transitions "neutralize p1" 438 and "neutralize p2" 440, either of which may enable places cancelling 442 and p3 446, which then lead to a transition "finish cancellation" 448 and ultimately a cancelled place 450. As with the completion functions described above, the cancellation functions may include flushing the work buffer 416 and otherwise removing an existence of, or reference to, the state model 132a. In particular, a separate transition 'start cancellation' 444 is illustrated that may be associated with, for example, an exception or other error associated with the work buffer 416.

In some implementations, it may occur that a buffer(s) 414, 416 contain(s) fewer items than a number of activations of the activity that is consuming the input stream from the buffer(s). In such cases, the stream-in operation may return an uninitialized data object that corresponds to a null value.

As referenced above, an example scenario for stream-in operations may include implementation of a for-each construct, using the buffer(s) as a source(s). For example, a buffer may be streamed into a loop activity, where loop conditions may be used to specify an exit condition according to, for example, a size of the buffer. For example, such a loop may be specified to iterate over all elements of the buffer, e.g., by setting an appropriate and loop condition and based on a size of the buffer in lines and a number of lines being streamed into the activity per control flow activation. In situations in which a parallel execution of the for-each construct is desired, it is possible to replace the loop activity with a multiple instance activity, such as the multiple instance activity 110.

FIG. 5 is a block diagram illustrating a colored Petri net representation of a second example streaming operation of the system of FIG. 1. In the example of FIG. 5, and with reference to FIG. 1, the CPN 132b illustrates a state model for stream-out operations of the system 100 which may allow an activity to write lines (items) of the buffer 112.

In contrast to a conventional writing operation, e.g., of BPMN/BPEL, the illustrated stream out operation(s) provide an accumulation/appendation semantics, so that, instead of overwriting the value of a data object in the buffer(s), the new data object(s) are appended to existing contents of the target buffer (data object). In the present example(s), the streaming operations may obey maximum cardinality constraints defined for the target buffer(s). Such a constraint may be defined using an attribute (e.g., referenced as "maxCardinality") of a meta class DataObject. In some implementations, data also may be streamed out into a subelement of complex data objects, inasmuch as such a subelement defines sufficient maximum cardinality constraints.

If a target data object (i.e., buffer) has not been written before, i.e., is in a state "initialized," the first streaming operation will create the first list item for this buffer. In case of a multiple instance activity streaming out its data into the buffer, the individual data objects originating from the completion of the instances may be appended to the central buffer (e.g., the global buffer 414). The streaming operations may be considered to be executed atomically in a transactional sense. That is, if a buffer (data object) is the streaming target for multiple activities, the order of the writes may be non-deterministic, whereas the operations themselves may be sequentialized, e.g., but the buffer access manager 134) in order to avoid problems in concurrent access scenarios.

Thus, in FIG. 5, the CPN 132b is largely similar to the CPN 132a of FIG. 4, except that (for example) in FIG. 5, the work buffer 416 serves the purpose of a buffer for the result to be streamed out. In example embodiments, a completion (e.g., 430/432) of the activity instance may trigger the stream-out operation (e.g., as opposed to streaming the data items/lines asynchronously over time, e.g., as the items/lines become available). Thus, the transition Start Completion 426 may be seen to consume both list tokens from work buffer 416 and the global buffer 414, to thereby produce a new list of items. The list may be generated by appending the work buffer 416 to the global buffer 414, and placing it again in the global buffer 414. Such operations are illustrated in FIG. 5 with an "append items" function 502, which appendation of the work buffer contents to the global buffer contents as just described, and doing so (as referenced above) as part of a completion (i.e., "start completion" transition 426) of the activity in question.

FIG. 6 is a block diagram illustrating a colored Petri net representation of a third example streaming operation of the system of FIG. 1. In the example of FIG. 6, and with reference to FIG. 1, the CPN 132c illustrates a state model for copy-back operations of the system 100 which may allow an activity to read lines (items) of the buffer 112, modify or transform the lines (e.g., perform an alteration of values), and return the modified/transformed lines to the buffer 112.

Continuing with reference to FIG. 1, it may occur that items 114a-114c may represent line items of a purchase order, each of which should be checked for their availability in stock. In some example implementations, a multiple instance activity (e.g., such as the activity 110) may be used to process the input set of items 114a-114c of the buffer 112, which may represent, in this example, a purchase order object. Then, each activity instance may check an availability of the stock item corresponding to a particular one of the line items 114a-114c. Then, each activity instance may write back the result of the availability check to the original line item of the purchase order data object (buffer 112).

The following semantics may be used for such copy-back operations. First, the continuous list of data objects streamed into an activity may be replaced with the list of data objects streamed out of the same activity. Second, if the number of elements streamed out of the activity exceeds the number of elements streamed into it before, the original list may be expanded at the position of the originally streamed partition. Third, if the number of elements streamed out of the activity is smaller than the number of elements streamed into it before, the original list may be contracted at the position of the originally streamed partition.

Graphically, differences between the stream-out, stream-in, and copy-back operations may be represented by using single-headed arrows for the first two operations (such as the arrow in FIG. 1 leading from the buffer 112 to the activity 108 for a stream in operation), and by using double-headed arrows for the last (copy-back) operation (such as the arrow between the multiple instance activity 110 and the buffer 112). As also referenced with respect to FIG. 1, the locking manager 138 may be responsible for ensuring that no concurrent write accesses occur between, e.g., different activities of the process model 102, each of which may be trying to modify (e.g., write back to) the same buffer. As already described, in such cases, the locking manager 138 may, for example, configure the buffer 112 to operate in a "stream-in only" mode of operation in which all activities except one (i.e., the activity allowed to write back to the buffer 112) are not allowed to write to the buffer 112 until again permitted by the locking manager 138.

The CPN 132c of FIG. 6 illustrates an example of a formalization of the just-referenced copy-back semantics and definitions. Since the CPN 132c contemplates both the stream-in operation(s) of FIG. 4 and the stream-out operations of FIG. 5, FIG. 6 may be understood to include a combination of the CPN models 132a and 132b of FIGS. 4 and 5, respectively.

In FIG. 6, a "replace items" function 602 is analogous to the "append items" function of FIG. 5. However, instead of simply appending items from the work buffer 416 to the global buffer 414 as in FIG. 5, the "replace items" function 602 specifies specific (sets of) items of the global buffer 414 that are to be replaced, starting at a specified value "n" of the global buffer 414 (e.g., to replace 5 line items of the global buffer 414, starting at line 10). Conceptually similarly to the read index counter 412, an index 604 may be used to maintain a current copy-back position "n" within the global buffer 414. Since the start index for this particular activity instance is required, the index 604 may be stored in the context 406 of the activity instance (place index), as shown.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor;
   a non-transitory computer-readable medium storing executable instructions that when executed by the at least one processor are configured to implement:
   a buffer configured to store a plurality of items, and configured to be accessed by a plurality of activities of an instance of a process model;
   a scheduler configured to cause the at least one processor to schedule execution of each of the plurality of activities of the instance of the process model, and configured to determine a first activation of a first activity of the plurality of activities, and a second activation of a second activity of the plurality of activities, the scheduler including an activity manager configured to access a first activity profile of the first activity upon the determining of the first activation, and access a second activity profile of the second activity upon determining of the second activation, the first activity profile and the second activity profile including different buffer access characteristics that specify a manner in which a respective activity accesses the buffer within the instance of the process model; and a process execution unit configured to cause the at least one processor to execute the first activity and the second activity within the instance of the process model, the process execution unit including a buffer access manager configured to access the buffer when executing the first activity based on the buffer access characteristics of the first activity profile and access the buffer when executing the second activity based on the buffer access characteristics of the second activity profile, the first activity being activated only once to execute a plurality of access operations with respect to the buffer, the buffer access manager including an order mediator, wherein when streaming out from the buffer using multiple views on the same buffer, the order mediator is configured to provide multiple ordering views on the buffer by receiving the plurality of items from the buffer, reordering the received plurality of items of the buffer for inclusion within a first reordered buffer in which the plurality of items of the buffer are ordered for the first activity according to a first order, and reordering the received plurality of items of the buffer for inclusion within a second reordered buffer in which the plurality of items of the buffer are ordered for the second activity according to a second order such that the plurality of items are streamed in different orders to the first and second activities, the first order being different than the second order.

2. The system of claim 1 wherein the buffer includes:
a global buffer that is accessible by all of the plurality of activities; and
a work buffer that is used during the execution of the first activity and that stores a subset of the plurality of items until the execution of the first activity is completed.

3. The system of claim 1 wherein the scheduler is configured to determine a completion of an activity previous to the first activity and perform a control flow activation of the first activity.

4. The system of claim 1 wherein the activity manager is configured to generate a state model of the first activity, based on the first activity profile and the buffer access characteristics of the first activity profile, and is configured to provide the state model to the process execution unit for execution of the first activity based thereon.

5. The system of claim 1 wherein the buffer access characteristics of the first activity profile specify a number of items to be exchanged with the buffer during each access operation of the plurality of access operations by the first activity.

6. The system of claim 5 wherein the buffer access manager is configured to maintain an index counter per each activity occurrence during which the buffer is accessed, the index counter providing a current position in the buffer at which a next activity occurrence should begin to exchange the number of items.

7. The system of claim 1 wherein the buffer access manager is configured to stream items output by the execution of the first activity by the process execution unit to the buffer, for appending to a current content thereof.

8. The system of claim 1 wherein the buffer access manager is configured to:
stream in items from the buffer to the first activity for modification thereof during execution of the first activity by the process execution unit; and
stream out the streamed-in items as modified by the execution of the first activity to the buffer, for replacement of the streamed-in items therewith.

9. The system of claim 8 wherein the buffer access manager comprises:
a locking manager configured to determine the streamed-in items, and configured to maintain the streamed-in items within the buffer in a read-only mode in which no other activity is permitted to replace the streamed-in items within the buffer until the first activity has streamed out the streamed-in items as modified by the execution of the first activity.

10. The system of claim 1 wherein the activity manager is configured to generate a state model of the first activity based on the first activity profile, and provide the state model to the process execution unit for execution of the first activity based thereon, the state model including a colored Petri net (CPN) model.

11. The system of claim 1, wherein, when performing a copy-back operation with respect to the buffer, the buffer access manager is configured to provide the first activity and the second activity concurrent access to the buffer such that the first activity and the second activity can concurrently access the plurality of items of the buffer during the execution of the first activity and the second activity.

12. The system of claim 1, wherein the plurality of items are initially ordered within the buffer as first-in-first-out (FIFO) or last-in-first-out (LIFO).

13. A computer program product for executing process models, the computer program product being embodied on a non-transitory computer-readable medium and including executable code that, when executed, is configured to cause at least one processor of at least one data processing apparatus to:
schedule execution of a plurality of activities of a process model including determining an activation of a first activity of the plurality of activities and an activation of a second activity of the plurality of activities;
access a first activity profile of the first activity and a second activity profile of the second activity, the first and second activity profiles including different buffer access characteristics that specify a manner in which a respective activity accesses a buffer storing a plurality of items;
execute the first activity and the second activity within an instance of the process model including accessing the buffer when executing the first activity based on the buffer access characteristics of the first activity profile and accessing the buffer when executing the second activity based on the buffer access characteristics of the second activity profile, the first activity being activated only once to execute a plurality of access operations with respect to the buffer; and
when streaming out from the buffer using multiple views on the same buffer, provide multiple ordering views on the buffer by receiving the plurality of items from the buffer, reordering the received plurality of items of the buffer for inclusion within a first reordered buffer in which the plurality of items of the buffer are ordered for the first activity according to a first order, and reordering the received plurality of items of the buffer for inclusion within a second reordered buffer in which the plurality of items of the buffer are ordered for the second activity according to a second order such that the plurality of items are streamed in different orders to the first and second activities, the first order being different than the second order.

14. The computer program product of claim 13 wherein the buffer access characteristics of the first activity profile include a specification of a number of items to be exchanged during each exchange between the buffer and the first activity.

15. The computer program product of claim 13 wherein the plurality of activities are scheduled using scheduling information according to which the first activity and the second activity are activated by an orchestration engine during execution of the process model.

16. The computer program product of claim 13 wherein the executable code causes the at least one processor to generate a first temporary buffer that stores a first subset of the plurality of items from the buffer required by the first activity and a second temporary buffer that stores a second subset of the plurality of items from the buffer required by the second activity.

17. A method comprising:
   determining, using at least one processor, an activation of a first activity of a process model and an activation of a second activity of the process model;
   accessing, using the at least one processor, a first activity profile of the first activity and a second activity profile of the second activity, the first and second activity profiles including different buffer access characteristics that specify a manner in which a respective activity accesses a buffer storing a plurality of items;
   executing, using the at least one processor, the first activity and the second activity within an instance of the process model including accessing the buffer when executing the first activity based on the buffer access characteristics of the first activity profile and accessing the buffer when executing the second activity based on the buffer access characteristics of the second activity profile, the first activity being activated only once to execute a plurality of access operations with respect to the buffer; and
   when streaming out from the buffer using multiple views on the same buffer, providing, using the at least one processor, multiple ordering views on the buffer by receiving the plurality of items from the buffer, reordering the received plurality of items of the buffer for inclusion within a first reordered buffer in which the plurality of items of the buffer are ordered for the first activity according to a first order, and reordering the received plurality of items of the buffer for inclusion within a second reordered buffer in which the plurality of items of the buffer are ordered for the second activity according to a second order such that the plurality of items are streamed in different orders to the first and second activities, the first order being different than the second order.

18. The method of claim 17 wherein determining the activation of the first activity of the process model includes determining a control flow activation of the first activity.

19. The method of claim 17 wherein the first order is based on a priority level associated with one or more of the plurality of items.

20. The method of claim 17 wherein accessing the buffer comprises:
   streaming out at least one item from the first activity to the buffer, for appending thereof to a current content of the buffer.

* * * * *